(12) United States Patent
Zhang et al.

(10) Patent No.: US 10,147,288 B2
(45) Date of Patent: Dec. 4, 2018

(54) ALARM METHOD AND DEVICE

(71) Applicant: Xiaomi Inc., Beijing (CN)

(72) Inventors: Tao Zhang, Beijing (CN); Zhijun Chen, Beijing (CN); Pingze Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 103 days.

(21) Appl. No.: 15/072,827

(22) Filed: Mar. 17, 2016

(65) Prior Publication Data

US 2017/0124821 A1   May 4, 2017

(30) Foreign Application Priority Data

Oct. 28, 2015   (CN) .......................... 2015 1 0711332

(51) Int. Cl.
*G08B 13/00*   (2006.01)
*G08B 13/196*   (2006.01)
*G06K 9/62*   (2006.01)

(52) U.S. Cl.
CPC ..... *G08B 13/19606* (2013.01); *G06K 9/6256* (2013.01); *G06K 9/6262* (2013.01); *G08B 13/19656* (2013.01); *G08B 13/1966* (2013.01)

(58) Field of Classification Search
CPC .................. G08B 13/19606; G08B 13/1436
USPC ...................................................... 348/155
See application file for complete search history.

(56) References Cited

U.S. PATENT DOCUMENTS

| 6,097,429 A | 8/2000 | Seeley et al. |
| 6,985,172 B1 | 1/2006 | Rigney et al. |
| 2010/0026871 A1 | 2/2010 | Yonaha et al. |
| 2010/0098331 A1* | 4/2010 | Meng ........................ G06T 7/11 382/164 |
| 2012/0327241 A1* | 12/2012 | Howe ................ G06K 9/00771 348/155 |
| 2014/0029855 A1 | 1/2014 | Manako et al. |
| 2015/0104077 A1* | 4/2015 | Jung ................. G06F 17/30244 382/107 |
| 2015/0237313 A1 | 8/2015 | Wang et al. |
| 2016/0203525 A1* | 7/2016 | Hara .................. G06Q 30/0271 705/14.56 |

FOREIGN PATENT DOCUMENTS

| CN | 101572803 A | 11/2009 |
| CN | 101635835 A | 1/2010 |
| CN | 201662861 U | 12/2010 |

(Continued)

OTHER PUBLICATIONS

International Search Report of PCT/CN2015/099562, mailed from the State Intellectual Property Office of China dated Jul. 28, 2016.

(Continued)

*Primary Examiner* — Jeffery A Williams
(74) *Attorney, Agent, or Firm* — Finnegan, Henderson, Farabow, Garrett & Dunner LLP

(57) ABSTRACT

An alarm method is disclosed. The method may comprise acquiring a monitoring video, detecting whether the monitoring video contains a moving target, determining whether the moving target is a preset object if it is detected that the monitoring video contains the moving target, and forbidding sending corresponding alarm information to a terminal if the moving target is determined to be the preset object.

11 Claims, 9 Drawing Sheets

(56) References Cited

FOREIGN PATENT DOCUMENTS

| | | | |
|---|---|---|---|
| CN | 102142179 | A | 8/2011 |
| CN | 102479416 | A | 5/2012 |
| CN | 102811343 | A | 12/2012 |
| CN | 103516955 | A | 1/2014 |
| CN | 103581620 | A | 2/2014 |
| CN | 104392464 | A | 3/2015 |
| CN | 104658152 | A | 5/2015 |
| CN | 104700532 | A * | 6/2015 |
| EP | 0 977 437 | A2 | 7/1999 |
| JP | H9-93665 | A | 4/1997 |
| JP | 2004-295798 | A | 10/2004 |
| JP | 2008-538665 | A | 10/2008 |
| JP | 2014-041488 | A | 3/2014 |
| KR | 10-1036947 | B1 | 5/2011 |
| KR | 10-2012-0083086 | A | 7/2012 |
| KR | 10-1394242 | B1 | 5/2014 |
| RU | 2146837 | C1 | 3/2000 |
| WO | WO 2010024281 | A1 | 3/2010 |
| WO | WO 2012/124852 | A1 | 9/2012 |

OTHER PUBLICATIONS

Extended European Search Report of European Patent Application No. 16157319.1, from the European Patent Office, dated Feb. 10, 2017.
Lipton A. J. et al.: "Moving target classification and tracking from real-time video," Applications of Computer Vision, 1998. WACV '98. Proceedings., Fourth IEEE Workshop on Princeton, NJ, USA Oct. 19-21, 1998, Los Alamitos, CA, USA, IEEE Comput. Soc, US, Oct. 19, 1998 (Oct. 19, 1998), pp. 8-14, XP010315540, DOI: 10.1109/ACV.1998.732851, ISBN: 978-0-8186-8606-1.
English version of International Search Report of PCT/CN2015/099562, mailed from the State Intellectual Property Office of China dated Jul. 28, 2016.
Office Action issued in Chinese Patent Application No. 201510711332.5, dated Dec. 11, 2017.
Office Action issued in Japanese Patent Application No. 2016-535034, dated Nov. 21, 2017.
Office Action in counterpart European Application No. 16 157 319.1-1206, dated Feb. 26, 2018.

* cited by examiner

ALARM METHOD AND DEVICE

CROSS-REFERENCE TO RELATED APPLICATIONS

This application is based upon and claims priority to Chinese Patent Application No. 201510711332.5, filed on Oct. 28, 2015, the entire contents of which are incorporated herein by reference.

TECHNICAL FIELD

The present disclosure generally relates to Internet technologies and, more particularly, to an alarm method and device.

BACKGROUND

As cameras become common household products, camera-based real-time monitoring gets more and more popular. When a user is not at home or sleeps, a camera may monitor an interior of a room in real time based on a scene change detection technology, and may trigger an alarm when detecting an abnormal scene change. The scene change detection technology determines the abnormal scene change by comparing an image currently acquired by the camera and a preset scene model. However, when an object not dangerous to the user, for example, a pet, moves in the room, the camera may determine the movement of the pet as an abnormal scene change and may trigger a false alarm. Therefore, it is important to improve the alarm method to avoid such false alarms.

SUMMARY

One aspect of the present disclosure is directed to an alarm method. The method may comprise acquiring a monitoring video, detecting whether the monitoring video contains a moving target, determining whether the moving target is a preset object if it is detected that the monitoring video contains the moving target, and forbidding sending corresponding alarm information to a terminal if the moving target is determined to be the preset object.

Another aspect of the present disclosure is directed to an alarm device. The device may comprise a processor and a memory configured to store instructions executable by the processor. The processor may be configured to acquire a monitoring video, detect whether the monitoring video contains a moving target, determine whether the moving target is a preset object if it is detected that the monitoring video contains the moving target, and forbid sending corresponding alarm information to a terminal if the moving target is determined to be the preset object.

Another aspect of the present disclosure is directed to a non-transitory computer-readable storage medium storing instructions that, when executed by a processor of a device, cause the device to perform an alarm method. The method may comprise acquiring a monitoring video, detecting whether the monitoring video contains a moving target, determining whether the moving target is a preset object if it is detected that the monitoring video contains the moving target, and forbidding sending corresponding alarm information to a terminal if it is determined that the moving target is the preset object.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
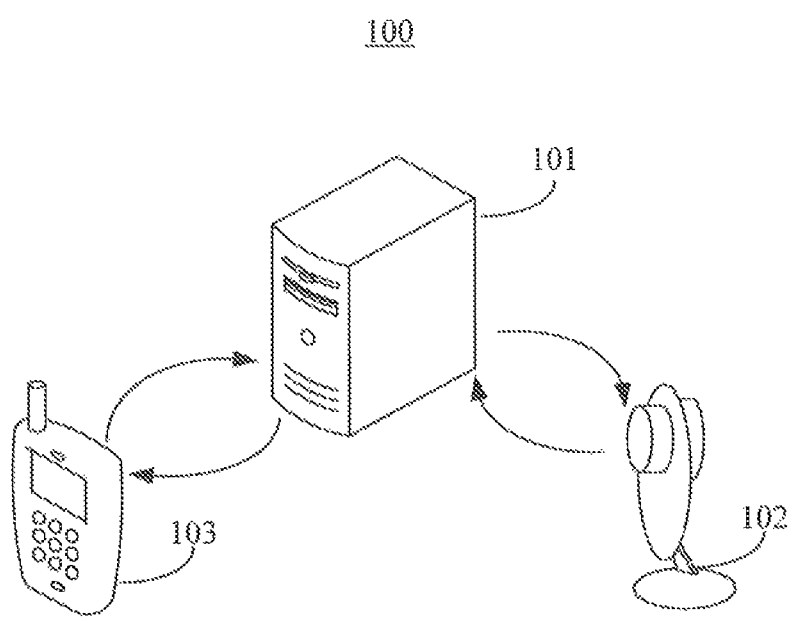
FIG. 1 is a schematic diagram illustrating an alarm system, according to an exemplary embodiment.

FIG. 1 is a schematic diagram illustrating an alarm system 100, according to an exemplary embodiment. The system 100 may include a server 101, smart camera equipment 102, and a terminal 103. The server 101 may be a single server, a server cluster including a plurality of servers, or a cloud computing service center. The smart camera equipment 102 may be a camera. The terminal 103 may be a mobile phone, a computer, a tablet, and the like. The server 101 may be connected with the smart camera equipment 102 and the terminal 103 respectively through a network. The server 101 is configured to obtain a monitoring video from the smart camera equipment 102 and to send alarm information to the terminal 103. The smart camera equipment 102 is configured to acquire the monitoring video in a monitoring area and transmit the monitoring video to the server 101. The terminal 103 is configured to obtain the alarm information from the server 101 and trigger an alarm.

Figure 2:
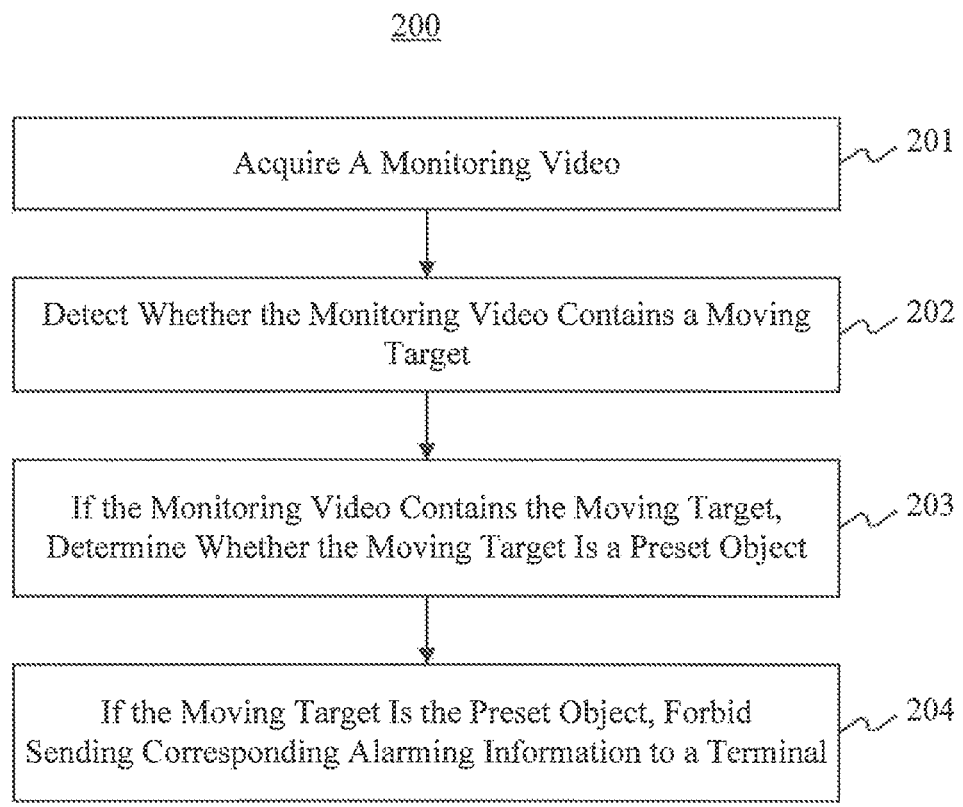
FIG. 2 is a flow chart illustrating an alarm method, according to an exemplary embodiment.

FIG. 2 is a flow chart illustrating an alarm method 200, according to an exemplary embodiment. The method 200 may be implemented by a server, such as the server 101 in the system 100 (FIG. 1), and may include the following steps:

Step 201: acquire a monitoring video;

Step 202: detect whether the monitoring video contains a moving target;

Step 203: if the monitoring video contains the moving target, determine whether the moving target is a preset object; and Step 204: if the moving target is the preset object, forbid sending corresponding alarm information to a terminal.

In some embodiments, the server may acquire the monitoring video, detectine whether the monitoring video contains a moving object, determine whether the moving target is a preset object if the monitoring video contains the moving object, and forbids sending corresponding alarm information to the terminal if the moving target is the preset object, so that false alarms triggered by movement of the preset object can be prevented, a false alarm rate can be lowered, and an alarm triggering accuracy can be improved.

In one embodiment, detecting whether the monitoring video contains a moving target may include: for each frame of video image in the monitoring video, acquiring a pixel value of each pixel in the frame; determining whether the video image contains foreground pixel(s), based on the acquired pixel value of each pixel and a preset background model; and if the video image contains the foreground pixel(s), determining that the monitoring video contains a moving target, otherwise, determining that the monitoring video does not contain a moving target.

In the illustrated embodiment, the preset background model is configured to represent a distribution characteristic of a pixel value of each background pixel in the video image on a time domain. Accordingly, whether the video image contains the foreground pixel(s) can be effectively determine based on the pixel value of each pixel in the video image and the preset background model. That is, whether the monitoring video contains a moving target can be effectively determined.

In one embodiment, after it is determined that the monitoring video does not contain a moving target, the method 200 may further include updating the background model based on the pixel value of each pixel in the video image.

The update can be in real time based on the pixel value of each pixel in the video image and may make the background model more flexible. That is, the update can make the background model closer and closer to a real distribution characteristic of the pixel values of current background pixels on the time domain, thereby improving moving target detection accuracy.

In one embodiment, determining whether the moving target is the preset object may include: determining a type of the moving target based on a preset classification model; and if the determined type is a preset type, determining that the moving target is the preset object.

After the server detects that the monitoring video contains the moving target, the server may determine whether the moving target is the preset object, to avoid triggering false alarms by the movement of the preset object.

In one embodiment, determining the type of the moving target based on the preset classification model may include: in the video image of the monitoring video, cropping an area where the moving target is located to obtain a target image; processing a size of the target image into a preset size; and determining the type of the moving target based on the preset classification model and the processed target image.

The preset classification model may process an image in the preset size to determine a type of an object included in the image, so that the server can crop the area where the moving target is located to obtain the target image, and process the size of the target image into the preset size for the preset classification model, to determine the type of the moving target based on the processed target image, and to improve the type determination efficiency.

In one embodiment, the preset object may include a pet. When the preset object includes the pet, false alarming triggered by movement of the pet may be avoided, the false alarm rate can be lowered, and the alarm accuracy can be improved.

The above-described embodiments may be freely combined to form embodiments of this disclosure, and will not be elaborated.

Figure 3:
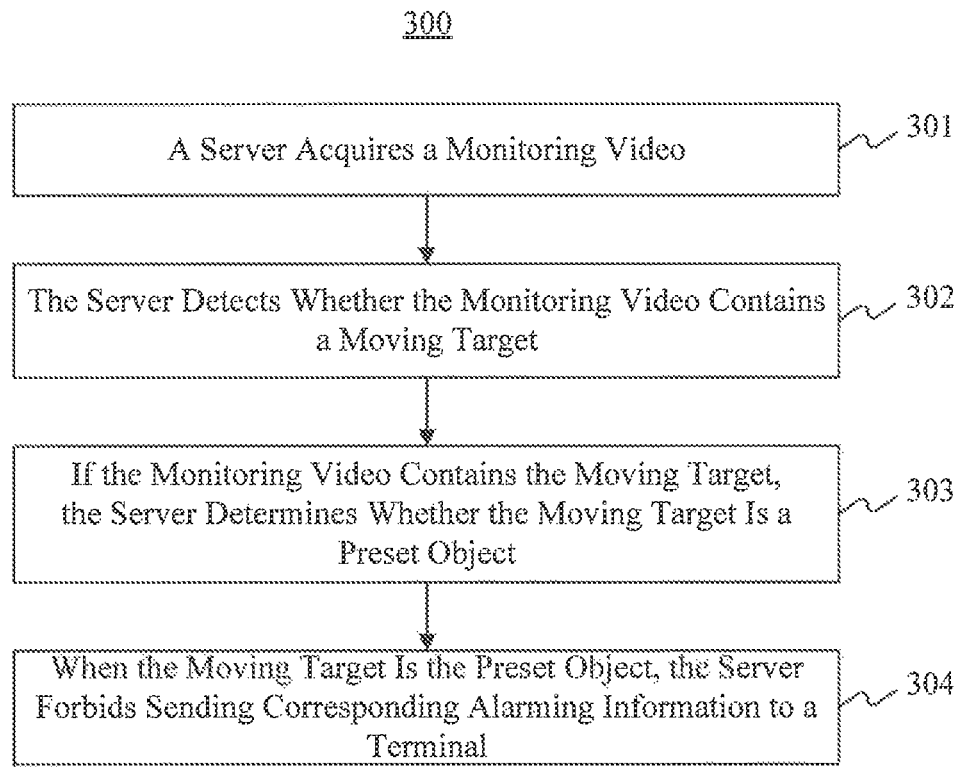
FIG. 3 is a flow chart illustrating an alarm method, according to an exemplary embodiment.

FIG. 3 is a flow chart illustrating an alarm method 300, according to an exemplary embodiment. The method 300 may include the following steps.

Step 301: a server acquires a monitoring video.

The server may acquire the monitoring video from smart camera equipment, and the smart camera equipment may transmit the monitoring video to other equipment, from which the server may acquire the monitoring video.

The smart camera equipment is configured to acquire the monitoring video in a monitoring area.

In addition, the smart camera equipment may communicate with the server or the other equipment through a wired or wireless network. When the smart camera equipment communicates with the server or the other equipment through the wireless network, the smart camera equipment may communicate with the server or the other equipment through a built-in Wireless Fidelity (WIFI) communication chip, a BlueTooth (BT) communication chip, or any other wireless communication chip.

Step 302: the server detects whether the monitoring video contains a moving target.

The smart camera equipment may be fixed, i.e., the smart camera equipment may acquire a monitoring video of a fixed monitoring area. Detecting whether the monitoring video contains the moving target may be implemented by establishing a background model of the background of the fixed monitoring area, and comparing each frame of video image in the monitoring video with the background model to determine a foreground image in the fixed monitoring area, the foreground image being an image of a meaningful moving object while the background being still.

Therefore, detecting whether the monitoring video contains the moving target may be implemented as follows: for each frame of video image in the monitoring video, the server acquires a pixel value of each pixel of the frame, determines whether the video image contains foreground pixel(s), based on the pixel value of each pixel and a preset background model, determines that the monitoring video contains the moving target if the video image contains the foreground pixel(s) and, otherwise, determines that the monitoring video does not contain the moving target.

The preset background model is configured to represent a distribution characteristic of a pixel value of each background pixel in the video image on a time domain. The preset background model may be a mixed Gaussian model.

In addition, the background model may be preset. For example, the preset background model may be preset according to a distribution condition of the pixel value of each pixel in a preset video image of the monitoring video on the time domain.

Color characteristic can be an essential characteristic of an image, and may be represented by a pixel value of a pixel of the image. The pixel value may be numerical values such as a position, color, and brightness of the pixel, so that the server may determine whether the video image contains the foreground pixel(s) based on the pixel value of each pixel in the video image and the preset background model. If the video image contains the foreground pixel(s), it may indicate that there is a meaningful moving object in the video image and accordingly, the monitoring video contains the moving target.

When the server determines whether the video image contains the foreground pixel(s) based on the pixel value of each pixel and the preset background model, the server may match the pixel value of each pixel with the preset background model, determine that the video image does not contain the foreground pixel if the pixel value of each pixel can be matched with the preset background model and, otherwise, determine that the video image contains the foreground pixel, the foreground pixel(s) being pixel(s) having pixel value(s) unsuccessfully matched with the preset background model.

Furthermore, after the server determines that the monitoring video does not contain the moving target, the server may also update the preset background model based on the pixel value of each pixel in the video image.

The background model can be preset by the server, and the background may change by factors such as a light change or camera vibration. Therefore, to avoid moving target detection errors of the preset background model due to such factors, when the server determines that the monitoring video does not contain the moving target, the server may update the preset background model in real time based on the pixel value of each pixel in the video image to make the preset background model adaptive and closer to the real distribution characteristic of the pixel values of the current background pixels on a time domain, thereby improving the moving target detection accuracy.

Step 303: if the monitoring video contains the moving target, the server determines whether the moving target is a preset object.

To prevent false alarms caused by movement of the preset object, if the server detects that the monitoring video contains the moving target, the server may determine whether the moving target is the preset object. Determining whether the moving target is the preset object may include determining a type of the moving target based on a preset classification model, determining that the moving target is the preset object if the type of the moving target is a preset type and, otherwise, determining that the moving target is not the preset object.

The preset object may be an object not dangerous to a user, such as a pet. The preset object may also include any other object during a practical application, which is not limited in the embodiment of the present disclosure.

In addition, the preset type is a type of the preset object. For example, if the preset object includes a pet, the preset type may include cat or dog.

For example, if the server determines that the type of the moving target is cat based on the preset classification model and if the preset type includes cat and dog, the type of the moving target is the preset type, and correspondingly, the server may determine that the moving target is the preset object.

As another example, when the server determines that the type of the moving target is person based on the preset classification model and if the preset type includes cat and dog, the type of the moving target is not the preset type, and correspondingly, the server may determine that the moving target is not the preset object.

When the server determines the type of the moving target based on the preset classification model, the server may crop an area where the moving target is located in the video image of the monitoring video to obtain a target image, process a size of the target image into a preset size, and determine the type of the moving target based on the preset classification model and the processed target image.

When the server crops the area where the moving target is located in the video image of the monitoring video to obtain the target image, the server may define a rectangle area of the moving target from the video image where the moving target is located, and determine the rectangle area as an image area, i.e., the target image where the moving target is located in the monitoring video. The server may acquire foreground pixels from the video image where the moving target is located and combine the acquired foreground pixels to obtain the image area, i.e., the target image where the moving target is located in the monitoring video. The server may also remove background pixels in the video image where the moving target is located to obtain the image area, i.e., the target image where the moving target is located in the monitoring video, and the background pixels are pixels corresponding to pixel values successfully matched with the preset background model.

The preset classification model is configured to determine a type corresponding to an image. The preset classification model may distinguish multiple types, and the multiple types may include the preset type. The preset classification model may be pre-established, and when the preset classification model is established, the server may acquire sample picture sets corresponding to the multiple types respectively. Each sample picture set may correspond to a type, and each sample picture in each sample picture set may include an object of the type corresponding to the sample picture set. The server may process sizes of the sample pictures in the sample picture sets into the preset size, while keeping parameters of a characteristic layer of a preset training model unchanged, partially adjust parameters in a full connection layer of the preset training model based on the processed sample pictures in the sample picture sets and a preset training protocol, and adjust all parameters in a classifier layer of the preset training model to obtain the preset classification model.

Since the preset classification model may be pre-established, to improve type determination efficiency, the preset classification model may process an image in the preset size to determine a type of an object included in the image. Therefore, before determining the type of the moving target, the server may cut the area where the moving target is located to obtain the target image, and process the size of the target image into the preset size for the preset classification model to determine the type of the moving target based on the processed target image.

In exemplary embodiments, the preset size may be preset. For example, the preset size may be 224*224 pixels, 300*300 pixels, etc.

When the server determines the type of the moving target based on the preset classification model and the processed target image, the server may extract a characteristic vector from the target image according to the preset classification model, calculate probabilities of the target image belonging to the multiple types included in the preset classification model according to the characteristic vector and the preset classification model, and determine the type with the maximum probability as the type of the moving target.

Step 304: when the moving target is the preset object, the server forbids sending corresponding alarm information to a terminal.

The terminal may be connected with the server through the wired or wireless network. When the moving target is the preset object, e.g., the moving target is an object not dangerous to the user, the server may forbid sending corresponding alarm information to the terminal, thereby avoiding triggering false alarms due to the movement of the preset object, reducing the false alarm rate, and improving the alarm accuracy.

When the server determines that the moving target is not the preset object, the server may also determine whether to send the corresponding alarm information to the terminal.

The preset alarming strategy can indicate whether to send the corresponding alarm information to the terminal when the moving target is not the preset object. For example, the preset alarming strategy may be used to determine whether the moving target is a person and sending the alarm information to the terminal if the moving target is determined to be a person.

In addition, the alarm information can alert the user that an unusual moving target appears in the monitoring area.

Moreover, the terminal may broadcast the corresponding alarm information through a speaker on the terminal to alert the user.

In the embodiment of the present disclosure, the server may acquire the monitoring video, detect whether the monitoring video contains the moving target, determine whether the moving target is the preset object if the monitoring video contains the moving target, and forbid sending of the corresponding alarm information to the terminal if the moving target is the preset object. Thus, false alarms caused by the movement of the preset object can be avoided, the false alarm rate can be lowered, and the alarming accuracy can be improved.

Figure 4:
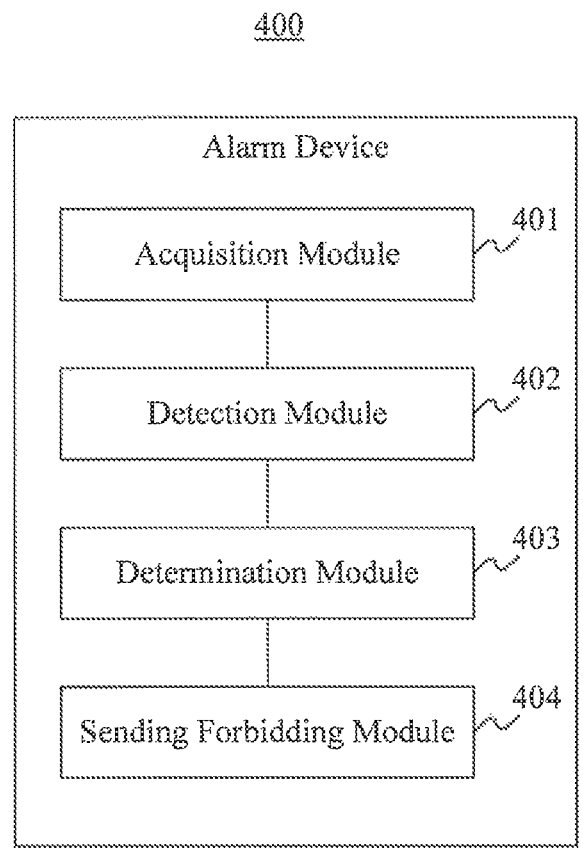
FIG. 4 is a block diagram illustrating an alarm device, according to an exemplary embodiment.

FIG. 4 is a block diagram illustrating an alarm device 400, according to an exemplary embodiment. The device 400 may include an acquisition module 401, a detection module 402, a determination module 403, and a sending forbidding module 404.

The acquisition module 401 is configured to acquire a monitoring video; the detection module 402 is configured to detect whether the monitoring video contains a moving target; the determination module 403 is configured to, if the monitoring video contains the moving target, determine whether the moving target is a preset object; and the sending forbidding module 404 is configured to, if the moving target is the preset object, forbid sending corresponding alarm information to a terminal.

Figure 5:
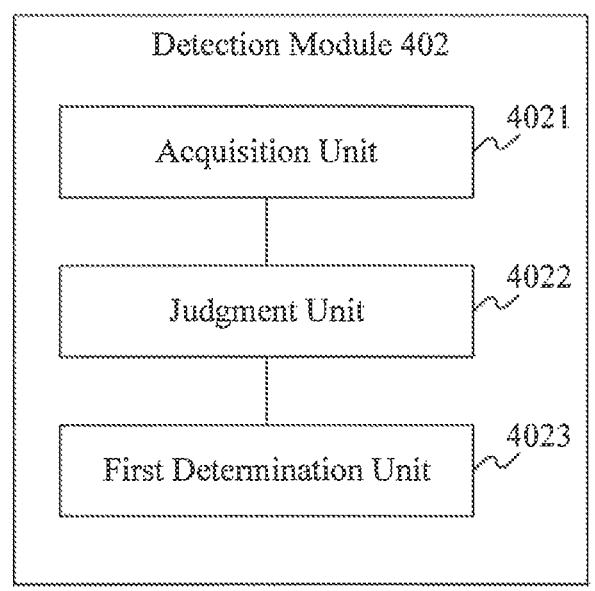
FIG. 5 is a block diagram illustrating a detection module, according to an exemplary embodiment.

FIG. 5 is a block diagram illustrating the detection module 402 (FIG. 4), according to an exemplary embodiment. The detection module 402 may include an acquisition unit 4021, a judgment unit 4022, and a first determination unit 4023.

The acquisition unit 4021 is configured to, for each frame of video image in the monitoring video, acquire a pixel value of each pixel in the video image; the judgment unit 4022 is configured to determine, based on the pixel value of each pixel and a preset background model, whether the video image contains foreground pixels; and the first determination unit 4023 is configured to, if the video image contains the foreground pixels, determine that the monitoring video contains the moving target and, otherwise, determine that the monitoring video does not contain the moving target.

Figure 6:
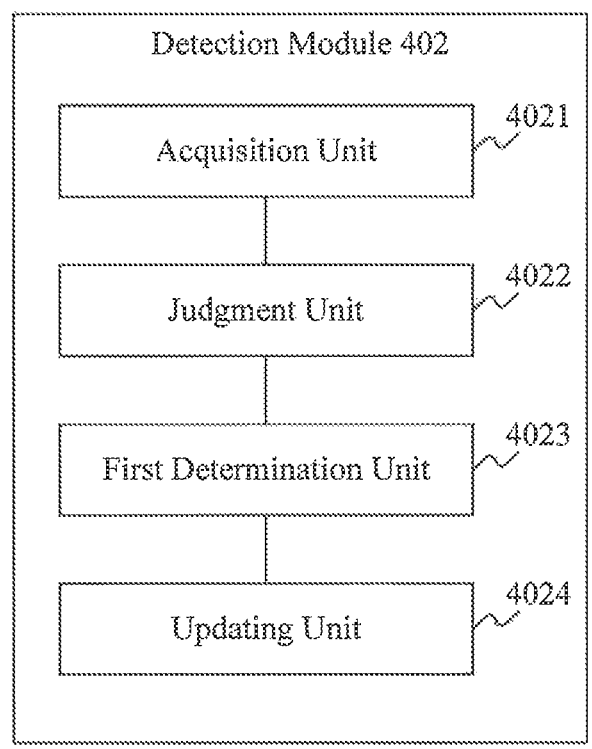
FIG. 6 is a block diagram illustrating a detection module, according to an exemplary embodiment.

FIG. 6 is a block diagram illustrating the detection module 402 (FIG. 4), according to an exemplary embodiment. The detection module 402 may further include an updating unit 4024, in addition to the acquisition unit 4021, the judgment unit 4022, and the first determination unit 4023 (FIG. 5).

Referring to FIG. 6, the updating unit 4024 is configured to update the preset background model based on the pixel value of each pixel in the video image.

Figure 7:
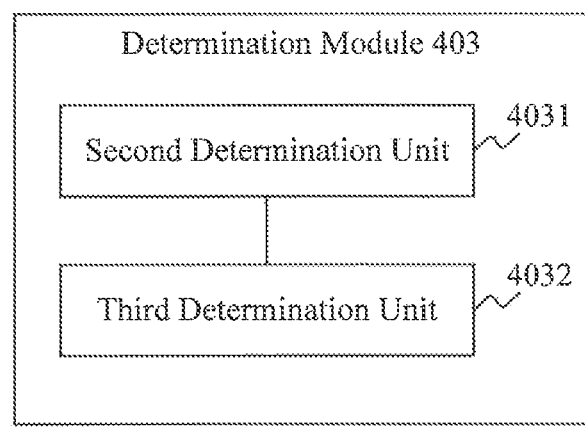
FIG. 7 is a block diagram illustrating a determination module, according to an exemplary embodiment.

FIG. 7 is a block diagram illustrating the determination module 403 (FIG. 4), according to an exemplary embodiment. The determination module 403 may include a second determination unit 4031 and a third determination unit 4032.

The second determination unit 4031 is configured to, if the monitoring video contains the moving target, determine a type of the moving target based on a preset classification model.

The third determination unit 4032 is configured to, if the type is a preset type, determine that the moving target is the preset object.

Figure 8:
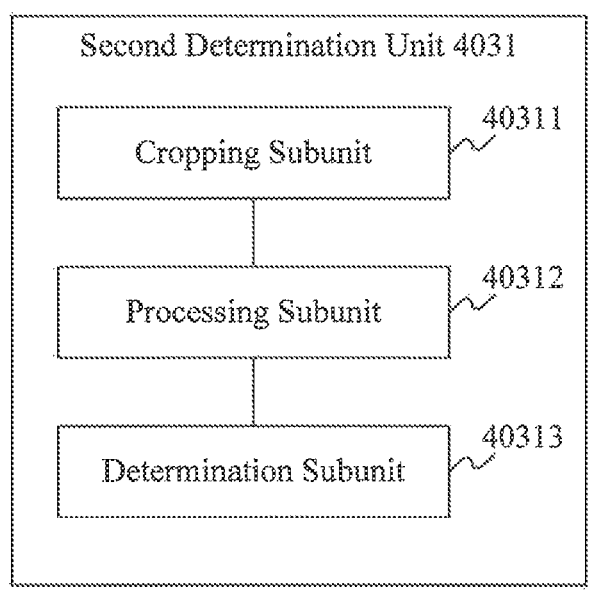
FIG. 8 is a block diagram illustrating a second determination unit, according to an exemplary embodiment.

FIG. 8 is a block diagram illustrating the second determination unit 4031 (FIG. 7), according to an exemplary embodiment. The second determination unit 4031 may include a cutting subunit 40311, a processing subunit 40312, and a determination subunit 40313.

The cropping subunit 40311 is configured to, if the monitoring video contains the moving target, crop an area where the moving target is located, in the video image of the monitoring video to obtain a target image; the processing subunit 40312 is configured to process a size of the target image into a preset size; and the determination subunit 40313 is configured to determine the type of the moving target based on the preset classification model and the processed target image.

In one embodiment of the present disclosure, the preset object includes a pet.

In one embodiment of the present disclosure, a server may acquire the monitoring video, detect whether the monitoring video contains the moving target, determine whether the moving target is the preset object if the monitoring video contains the moving target, and forbid sending corresponding alarm information to the terminal if the moving target is the preset object. Thus, false alarms caused by movement of the preset object can be avoided, a false alarm rate can be lowered, and alarm accuracy can be improved.

Figure 9:
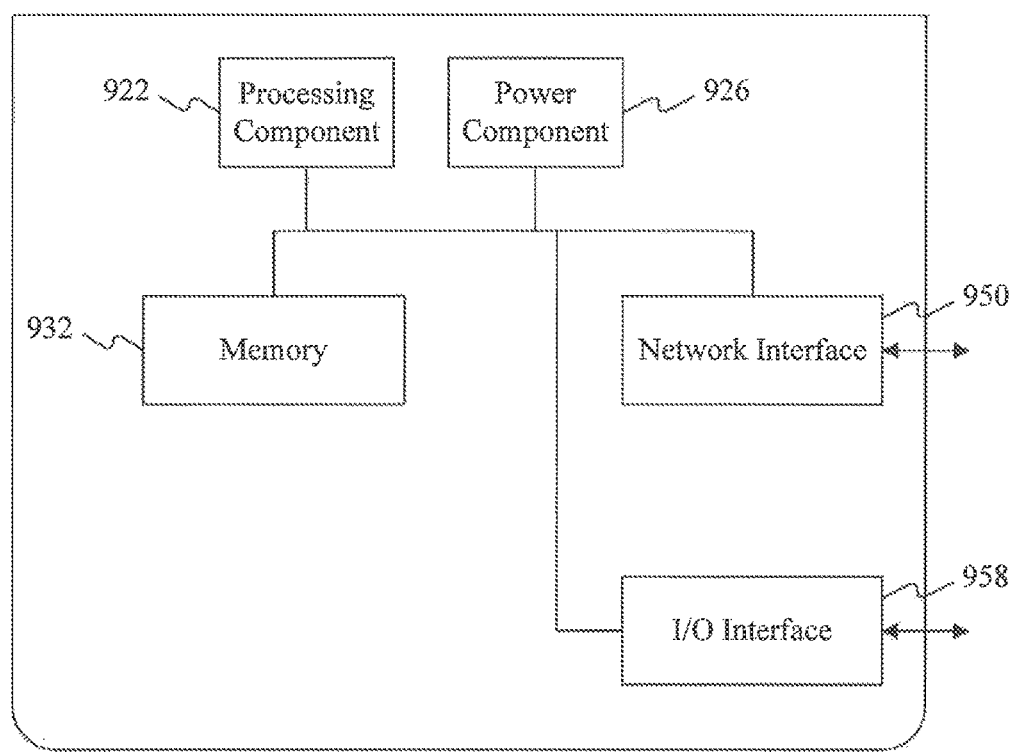
FIG. 9 is a block diagram illustrating an alarm device, according to an exemplary embodiment.

FIG. 9 is a block diagram illustrating an alarm device 900, according to an exemplary embodiment. For example, the device 900 may be a server. Referring to FIG. 9, the device 900 may include a processing component 922 which includes one or more processors, and a memory resource represented by a memory 932, configured to store instructions such as application programs executable for the processing component 922. The application programs stored in the memory 932 may include one or more modules each corresponding to a set of instructions.

The device 900 may further include a power component 926 configured to execute power management of the device 900, a wired or wireless network interface 950 configured to connect the device 900 to a network, and an Input/Output (I/O) interface 958. The device 900 may operate based on an operating system stored in the memory 932, such as Windows Server™, Mac OS X™, Unix™, Linux™, FreeBSD™ and the like.

The processing component 922 is configured to execute the instructions to perform the above described alarm methods. For example, the method includes: acquiring a monitoring video; determining whether the monitoring video contains a moving target; if the monitoring video contains the moving target, determining whether the moving target is a preset object; and if the moving target is the preset object, forbidding sending corresponding alarm information to a terminal.

In one exemplary embodiment, there is provided a non-transitory computer-readable storage medium including instructions, such as included in the memory 932, executable by the processing component 922 of the device 900 to perform the above described methods. For example, the non-transitory computer-readable storage medium may be a Read-Only Memory (ROM), a Compact Disc Read-Only Memory (CD-ROM), a magnetic tape, a floppy disk and optical data storage equipment, and the like.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of submodules/subunits.

Other embodiments of the invention will be apparent to those skilled in the art from consideration of the specification and practice of the present disclosure. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A processor-implemented alarm method, comprising:
    acquiring a monitoring video from camera equipment in communication with a processor;
    detecting whether the monitoring video contains a moving target;
    if it is detected that the monitoring video contains the moving target, determining whether the moving target is a preset object; and
    if the moving target is determined to be the preset object, forbidding sending corresponding alarm information to a terminal,
    wherein detecting whether the monitoring video contains the moving target comprises:
        acquiring a pixel value of each pixel in a video image of the monitoring video;
        determining, based on the pixel value of each pixel in the video image and a preset background model, whether the video image contains foreground pixels, the preset background model being configured to represent a distribution characteristic of a pixel value of each background pixel in the video image on a time domain; and
        if it is determined that the video image contains the foreground pixels, determining that the monitoring video contains the moving target; and
    wherein determining whether the moving target is a preset object comprises:
        in the video image of the monitoring video, cropping an area where the moving target is located to obtain a target image;
        processing a size of the target image into a preset size;
        extracting a characteristic vector from the target image according to a preset classification model;
        calculating probabilities of the target image belonging to multiple types included in the preset classification model, according to the characteristic vector and the preset classification model;
        determining a type with a maximum probability as a type of the moving target; and
        when the determined type is a preset type, determining that the moving target is the preset object.

2. The method according to claim 1, further comprising:
    updating the preset background model based on the pixel value of each pixel in the video image.

3. The method according to claim 1, wherein the preset object comprises a pet.

4. An alarm device, comprising:
    a processor in communication with camera equipment; and
    a memory configured to store instructions executable by the processor,
    wherein the processor is configured to:
    acquire a monitoring video from the camera equipment;
    detect whether the monitoring video contains a moving target;
    if it is detected that the monitoring video contains the moving target, determine whether the moving target is a preset object; and
    if the moving target is determined to be the preset object, forbid sending corresponding alarm information to a terminal,
    wherein, in detecting whether the monitoring video contains the moving target, the processor is further configured to:
        acquire a pixel value of each pixel in a video image of the monitoring video;
        determine, based on the pixel value of each pixel in the video image and a preset background model, whether the video image contains foreground pixels, the preset background model being configured to represent a distribution characteristic of a pixel value of each background pixel in the video image on a time domain; and
        if it is determined that the video image contains the foreground pixels, determine that the monitoring video contains the moving target; and
    wherein, in determining whether the moving target is a preset object, the processor is further configured to:
        in the video image of the monitoring video, crop an area where the moving target is located to obtain a target image;
        process a size of the target image into a preset size;
        extract a characteristic vector from the target image according to a preset classification model;
        calculate probabilities of the target image belonging to multiple types included in the preset classification model, according to the characteristic vector and the preset classification model;
        determine a type with a maximum probability as a type of the moving target; and
        when the determined type is a preset type, determine that the moving target is the preset object.

5. The device of claim 4, wherein the processor is further configured to:
    update the preset background model based on the pixel value of each pixel in the video image.

6. The device of claim 4, wherein the preset object comprises a pet.

7. A non-transitory computer-readable storage medium storing instructions that, when executed by a processor of a device, cause the device to perform an alarm method, the method comprising:

acquiring a monitoring video from camera equipment in communication with the processor;

detecting whether the monitoring video contains a moving target;

if it is detected that the monitoring video contains the moving target, determining whether the moving target is a preset object; and if it is determined that the moving target is the preset object, forbidding sending corresponding alarm information to a terminal, wherein detecting whether the monitoring video contains the moving target comprises:

acquiring a pixel value of each pixel in a video image of the monitoring video;

determining, based on the pixel value of each pixel in the video image and a preset background model, whether the video image contains foreground pixels, the preset background model being configured to represent a distribution characteristic of a pixel value of each background pixel in the video image on a time domain; and if it is determined that the video image contains the foreground pixels, determining that the monitoring video contains the moving target; and wherein determining whether the moving target is a preset object comprises:

in a video image of the monitoring video, cropping an area where the moving target is located to obtain a target image;

processing a size of the target image into a preset size;

extracting a characteristic vector from the target image according to a preset classification model;

calculating probabilities of the target image belonging to multiple types included in the preset classification model, according to the characteristic vector and the preset classification model;

determining a type with a maximum probability as a type of the moving target; and when the determined type is a preset type, determining that the moving target is the preset object.

8. The non-transitory computer-readable storage medium of claim 7, the method further comprising:

updating the preset background model based on the pixel value of each pixel in the video image.

9. The non-transitory computer-readable storage medium of claim 7, wherein the preset object comprises a pet.

10. The method according to claim 1, further comprising:

pre-establishing the preset classification model by acquiring sample picture sets corresponding to multiple types respectively;

wherein the preset classification model is configured to distinguish the multiple types and determine a type of an image.

11. The method according to claim 1, wherein determining, based on the pixel value of each pixel in the video image and a preset background model, whether the video image contains foreground pixels comprises:

matching the pixel value of each pixel with the preset background model; determining that the video image does not contain the foreground pixel when the pixel value of each pixel is matched with the preset background model; otherwise, determining that the video image contains the foreground pixel;

wherein the foreground pixel is a pixel with a pixel value unsuccessfully matched with the preset background model.

* * * * *